Patented Feb. 3, 1948

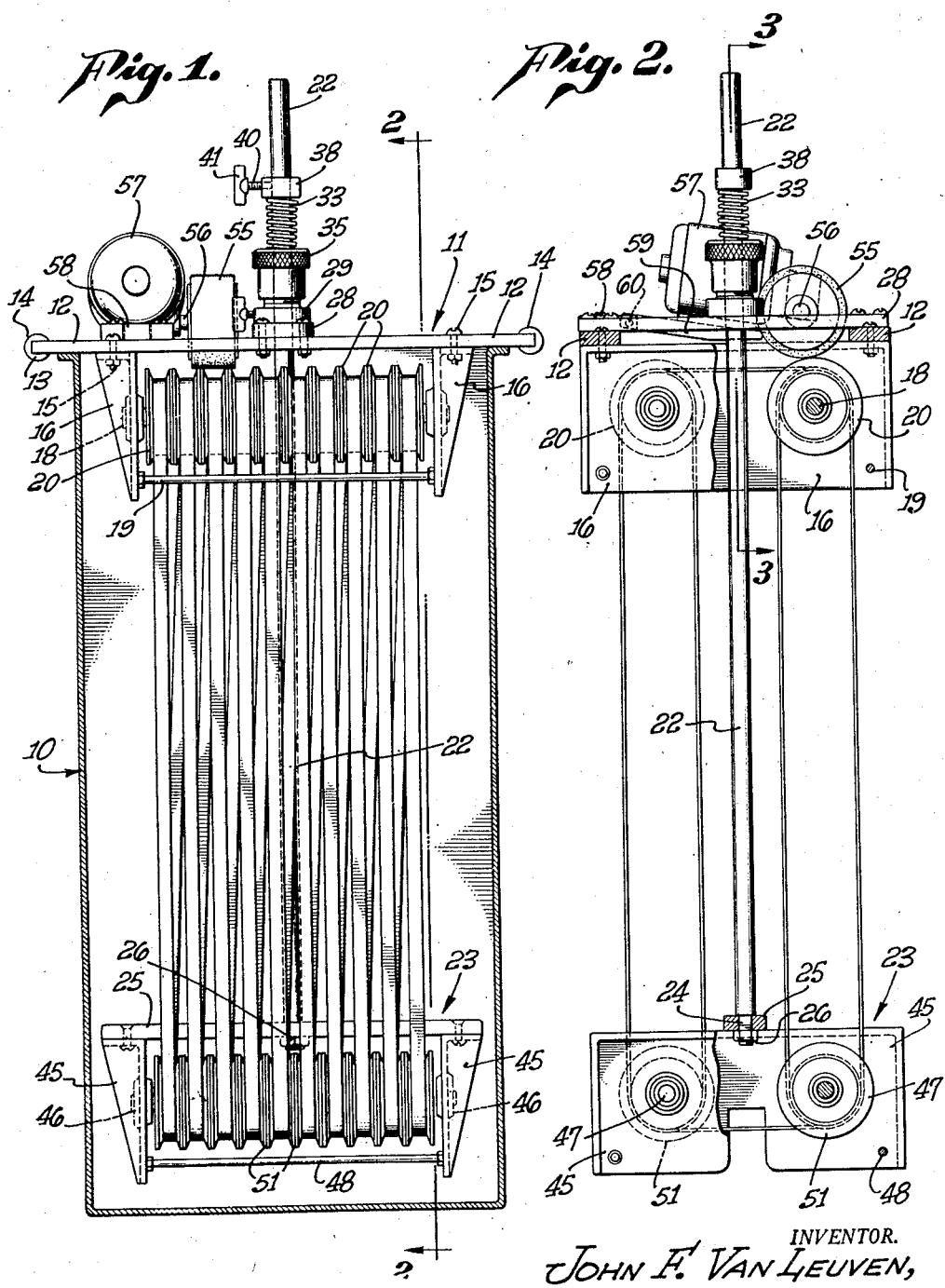

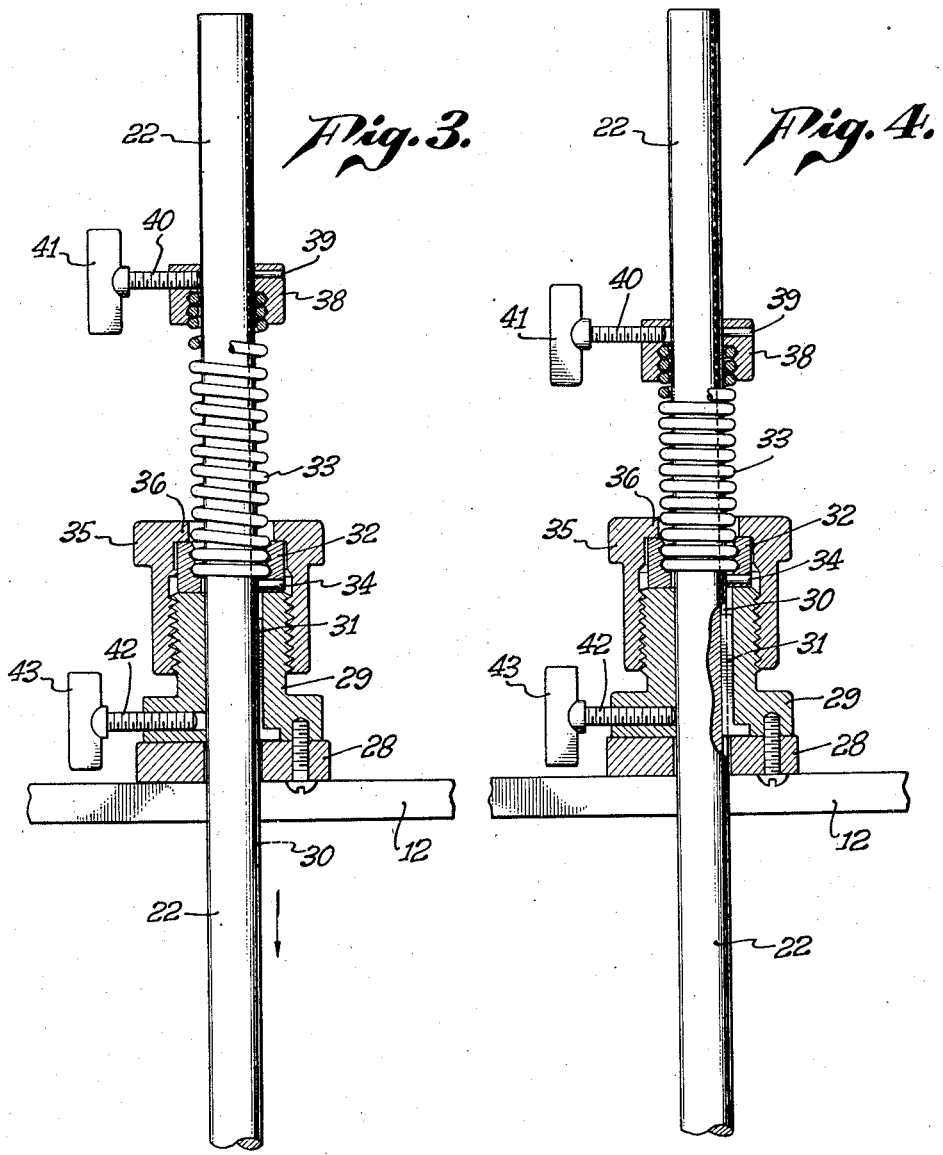

2,435,298

UNITED STATES PATENT OFFICE 2,435,298

PORTABLE FILM RACK

John F. Van Leuven, Pacific Palisades, Calif.

Application July 1, 1944, Serial No. 543,073

3 Claims. (Cl. 271—2.3)

This invention relates to apparatus used for the purpose of processing motion picture film, being more particularly a portable film rack for motion picture film.

The film rack of the present invention is a complete unit in itself upon which a limited footage of film may be handled, for instance, one or two hundred feet, the film being so mounted on the rollers that the film may be continuously run during the respective steps of the processing operation, the unit including a motor installed on the rack for the purpose of driving the film.

One of the objects of this invention is to produce a portable film rack unit of simple form and construction in which the film may be driven and the film given essentially the same treatment in a batch operation as is ordinarily done by a continuous processing machine.

Another object of this invention is to produce a portable film rack of simple form and construction in which the film supporting rollers are automatically adjusted to accommodate the changes in length of film during the processing operation.

Another object of this invention is to produce a film rack of simple form and construction in which the film passes over an upper stationary set of rollers and a lower set of rollers movable with respect to the upper set, the lower set of rollers being so arranged that they are yieldingly supported with respect to the upper set so that compensation automatically takes place for variation in the length of film during the processing operation.

Other objects and advantages will appear hereinafter from the following description and drawings.

Referring to the drawings, which are for illustrative purposes only:

Fig. 1 is a face view of a film rack unit embodying a form of my invention;

Fig. 2 is a sectional elevational view on line 2—2, Fig. 1;

Fig. 3 is an enlarged sectional view on line 3—3, Fig. 2, showing the suspension portion of the apparatus in the position assumed during a treatment of the film;

Fig. 4 is a view similar to Fig. 3 showing the parts in the position assumed when the unit is standing on a floor during periods of non-use; and Fig. 5 is a fragmentary plan view of a portion of the upper frame of the apparatus.

Referring more particularly to the drawings, 10 diagrammatically illustrates a tank which may contain developer, a fixing solution, or wash-water, as the case maybe, upon the upper edge of which is supported the upper frame of the unit indicated generally at 11. This upper frame consists of longitudinal members indicated at 12 and cross members indicated at 13, the members 12 and 13 being joined together in any suitable manner. The outside edges of the members 13 are rounded as indicated at 14 to form handle portions by which the rack may be grasped for moving the unit as may be required. Attached to the members 12 by means of bolts 15 are two upper hangers indicated at 16, these hangers being spaced apart and having mounted thereon upper shafts indicated at 18. The lower ends of the hangers 16 are spaced apart and held in fixed relation to each other by means of rods indicated at 19. Freely mounted on the shaft 18 is a plurality of upper rollers or spools indicated at 20.

22 indicates a vertically extending rod or connecting means by which the lower frame generally indicated at 23 is connected to but movable with relation to the upper frame. The rod 22 is provided at its lower end with a threaded end indicated at 24 extending through a cross piece 25, a nut 26 being provided to firmly secure the lower end of the rod 22 to the cross piece 25.

Supported on a cross piece indicated at 28 which is secured to the longitudinal members 12 of the upper frame is a fitting 29 through which the rod 22 slidably extends. The rod is provided with a groove or keyway 30 into which extends a key or spline 31 mounted in the fitting which prevents turning of the rod 22 in the fitting 29 but which permits longitudinal movement of the rod in such fitting. Seated on the upper end of the fitting 29 is a collar indicated at 32 which freely receives the rod 22 and is formed interiorly on a portion of its inner face with threads which receive and retain therein the lower convolutions of the end of a coiled spring indicated at 33. This collar 32 is provided with a pin 34 which also extends into the groove 30 in the rod 22 which prevents turning of the collar on the rod. The collar 32 is held in engagement with the upper end of the fitting 29 by means of a cap indicated at 35 which is interiorly threaded at its lower end to engage the exteriorly threaded upper end of the fitting 29, the cap 35 being provided with a shoulder 36 which engages the upper face of the collar 32.

Above the cap 35 and spaced apart therefrom is an upper collar 38 which is freely slidable on the rod 22 but which is provided with a pin 39 which extends into the groove 30 of the rod 22 and thereby prevents relative rotative movement by the rod 22 and collar 38. 40 indicates a bolt or screw threaded into the collar 38 and engageable at its inner end with the rod 22, the bolt being provided with a butterfly head or finger grip indicated at 41.

42 designates a similar bolt threaded into the fitting 29 which also is provided with a head 43. Forming part of the lower frame 23 are two downwardly extending hangers 45 secured by means of bolts to the cross piece or bar 25. These hangers 45 are also provided with bearings indicated at 46 which receive and support two spaced shafts indicated at 47, the hangers 45 at their lower ends being connected by a rod indicated at 48 in the same manner as the upper hangers 16.

The shafts 18 have freely mounted thereon a series of spools or rollers indicated at 20 and the lower shafts 47 each have freely mounted thereon a series of spools or rollers indicated at 51. The film is threaded over the upper set of rollers 20 and the lower set of rollers 51 in such a manner that, the ends of the film being joined together, upon driving of the rollers the film moves in a continuous path over the spools as generally indicated in Fig. 2. Means are provided for driving the spools, such means consisting of a drive roller indicated at 55 which preferably has a slightly resilient surface. This roller 55 is mounted on a shaft 56 which is driven in any suitable manner by means of an electric motor indicated at 57, such motor being mounted upon a cross piece indicated at 58 supported on the frame 11. In the form shown the motor is mounted upon an arm 59 pivotally connected to the cross piece at 60 so that the weight of the motor is carried by the drive roller 55 and is so yieldably held in contact with the peripheral edges of certain of the spools 50. In the upper frame 11 in the form shown in Fig. 1, the driving roll 55 engages the periphery of three of the spools or film carrying rollers. It is to be understood that the unit is supported on a tank by placing the unit in the tank with the upper frame 11 resting upon the tank as shown in Fig. 1.

The lower frame carrying the lower film spools is so supported from the upper frame that the lower frame is pushed downwardly by reason of the spring 33. This is so that lengthening of the film by reason of immersion in the liquid of the bath must be compensated for and the film kept fairly taut over the spools of the apparatus. The parts of the apparatus insofar as the support of the lower frame is concerned when the rack is not in use are illustrated in Fig. 4. That is, for instance, when the rack is not in use and standing on the floor. In this position the lower screw or bolt 42 is tightened against the rod 22, thereby fixing the rod against vertical movement in the fitting 29. The screw or bolt 40 is shown retracted from engagement with the rod 22 so that it may be said the spring 33 is in normal condition. When the film is threaded on the spools of the rack and the rack is ready for placing in a tank, then, while the screw 42 is in engagement with rod 22, the collar 38 is manually moved upwardly on the rod 22 into the position shown in Fig. 3. The screw or bolt 40 is then threaded into the collar 38 to an extent that such screw or bolt tightly engages the rod 22. This places tension on the spring 32 and the screw or bolt 42 is then retracted from engagement with the rod 22.

When in the position shown in Fig. 3, which may be termed the operative position, the lower end of the spring being secured in the collar 32 and the spring being under tension and its upper end secured in the upper collar 38, the rod is pulled downwardly by the tension of the spring 33. This downward movement of the rod is assisted by the weight of the lower frame and the spools thereon, the combined action of such weight and the tension of the spring insuring that as the film becomes wet and lengthens that the film will properly engage both the upper and lower spools with sufficient friction to insure that the film will be driven in a continuous spiral path during the processing operation.

It will be understood that after the film is removed from the various baths and either exposed to the air or is artificially dried by a current of air that the film will shorten in its length and have a tendency to cause the lower frame to move toward the upper frame. To accommodate this movement the bolt 40 is loosened, thereby permitting shortening of the film controlled by the weight of the lower frame and rollers thereon.

Although one form of the invention has been particularly shown and described, it is contemplated that various changes and modifications can be made without departing from the scope of the invention and it is intended to cover such changes and modifications as come within the scope of the claims.

I claim as my invention:

1. In a portable film processing unit the combination of: an upper frame adapted for resting upon a tank; a plurality of film carrying spools freely rotatably mounted in said frame, a lower frame, a plurality of film carrying spools freely rotatably mounted in said lower frame, connecting means between the upper and lower frames, said connecting means comprising a rod secured at its lower end to said lower frame and freely extending through the upper frame; a fitting secured to the upper frame slidably receiving said rod; a lower collar on said rod seated on the upper face of the fitting, a cap on said fitting retaining said collar thereon, an upper collar on said rod spaced apart from said lower collar, a coiled tension spring having its ends secured in said collars, means on said collars engageable with said rod to selectively fix said collars to said rod, and means mounted in the fitting engageable with said rod to prevent rotation of the said rod.

2. In a portable film processing unit a combination of: an upper frame adapted for resting upon a tank; hangers secured to said frame; a shaft mounted in said hangers; a plurality of film carrying spools on said shaft freely rotatable thereon; a lower frame; hangers on said frame; a shaft mounted in said hangers; a plurality of film carrying spools on said shaft freely rotatable thereon; a rod secured at its lower end to the lower frame and having its upper end slidably extending through the upper frame; a lower collar about said rod in fixed relation to the upper frame; an adjustable member mounted on the upper frame engageable with the rod below the lower collar; a tension spring about said rod having its lower end secured in said lower collar; an upper collar about said rod spaced above the lower collar; said tension spring having its upper end secured in said upper collar and adjustable means in said upper collar engageable with said rod.

3. In a portable film processing unit a combination of: an upper frame adapted for resting upon a tank; hangers secured to said frame; a shaft mounted in said hangers; a plurality of film carrying spools on said shaft freely rotatable thereon; a lower frame; hangers on said frame; a shaft mounted in said hangers; a plurality of film carrying spools on said shaft freely rotatable thereon; a rod secured at its lower end to the lower frame and having its upper end slidably extending through the upper frame; a fitting secured to the upper frame slidably receiving said rod; a lower collar on said rod seated on the upper face of the fitting; a cap on said fitting retaining said lower collar thereon; a threaded member threaded into said fitting engageable at its inner end with said rod; an upper collar on said rod spaced apart from said lower collar; a threaded member in said lower collar; a threaded member in said upper collar engageable at its inner end with said rod and a coiled tension spring having its lower end secured in the lower collar and its upper end secured in the upper collar.

JOHN F. VAN LEUVEN.

REFERENCES CITED

The following references are of record in the file of this patent:

UNITED STATES PATENTS

| Number | Name | Date |
|---|---|---|
| 1,444,818 | Westcott | Feb. 13, 1923 |
| 1,461,329 | Salins | July 10, 1923 |
| 1,854,604 | Steinmann | Apr. 19, 1932 |
| 2,102,843 | Gwynne | Dec. 21, 1937 |
| 2,334,721 | McMordie et al. | Nov. 23, 1943 |